Jan. 17, 1956 R. J. HARRISON 2,731,601
WAVE-GUIDE DIRECTIONAL COUPLER
Filed Nov. 13, 1945

INVENTOR
RALPH J. HARRISON

BY Ralph L Chappell
ATTORNEY

United States Patent Office 2,731,601
Patented Jan. 17, 1956

2,731,601
WAVE-GUIDE DIRECTIONAL COUPLER

Ralph J. Harrison, New York, N. Y., assignor, by mesne assignments, to the United States of America as represented by the Secretary of the Navy Application November 13, 1945, Serial No. 628,281

7 Claims. (Cl. 333—10)

This invention relates to wave guides, and more particularly to directional couplers for the same.

Directional couplers are used to abstract a fraction of the energy moving in one direction through a wave guide, without taking out any of the energy which may be moving in the opposite direction. Such couplers are used, for example, for power measurement of the power moving through the wave guide.

The primary object of the present invention is to generally improve directional couplers. Another object is to provide a directional coupler in which the auxiliary lead for the abstracted energy is itself a wave guide. Still another object is to provide a directional coupler in which the directional effect (or cancellation of undesired energy) is broad-banded, that is, not critical in respect to frequency.

To accomplish the foregoing objects, and others which will hereinafter appear, my invention resides in the directional coupler elements and their relation one to the other as are hereafter more particularly described in the following specification.

The specification is accompanied by a drawing in which.

Figure 1:
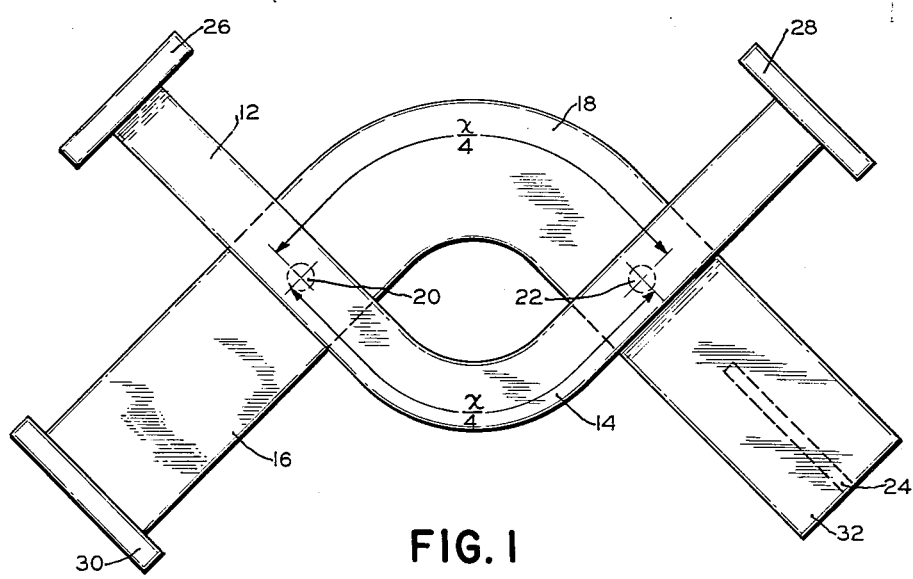
Fig. 1 is a plan view of a directional coupler embodying features of my invention.
Figure 2:
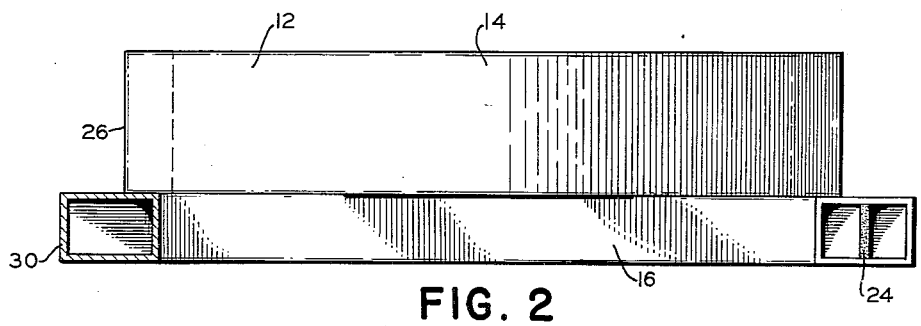
Fig. 2 is a front elevation of the same with the choke joints omitted in order to simplify the drawing.

Referring to the drawing and more particularly to Figs. 1 and 2, the directional coupler comprises a main wave guide 12 having a right angle bend at 14, and an auxiliary wave guide 16 having a right angle bend at 18. These wave guides are crossed, with the right angle bends 14 and 18 pointed in opposite directions, and with the crossover points 20 and 22 a quarter wave length apart (or an odd number of quarter wave lengths) measured around the bend of either wave guide. Appropriate coupling holes 20 and 22 are cut through the adjacent walls of the wave guides at the crossover points or junctions. The main wave guide 12 is open at both ends, while the auxiliary wave guide 16 is open at one end, the opposite end being terminated by an absorber 24, made of suitable resistance material.

In the specific coupler here shown the wave guides 12 and 16 are both rectangular wave guides. The wave guide 12 is bent in the plane of its narrow edge, that is, in the E-plane, and the auxiliary wave guide 16 is bent in the plane of its wide dimension, that is, in the H-plane.

With the arrangement as shown, the main energy flows through the wave guide 12 from the end 26 to the end 28. These ends may, if desired, be provided with conventional choke joints. A fraction of the energy flowing through wave guide 12 is abstracted by wave guide 16 and is discharged at the open end 30, which may also have a choke joint. The auxiliary wave guide does not respond to energy flowing in reverse direction through the main wave guide 12, that is, from the end 28 to the end 26.

Figures 3, 4:
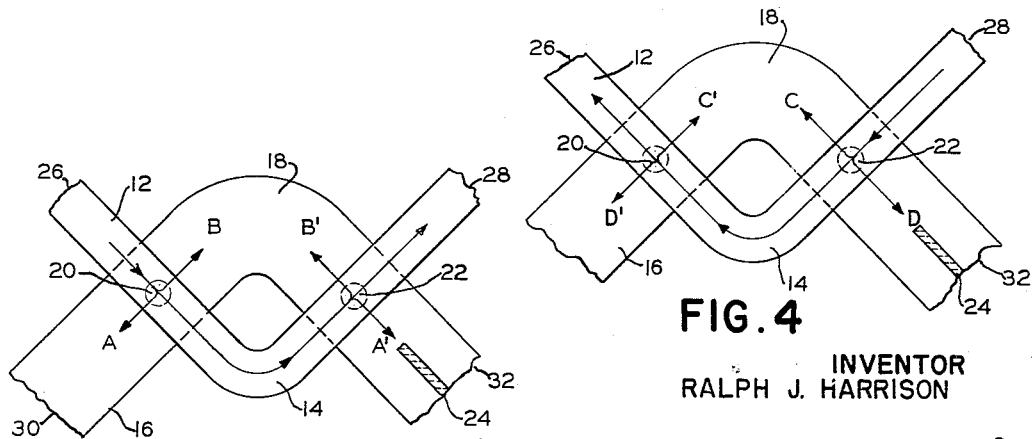
Figs. 3 and 4 are schematic views explanatory of the operation of the invention.

This may be explained as follows. Referring to Fig. 3, a fraction of the desired energy flowing from end 26 to end 28 goes through coupling hole 20 and divides as shown at A and B. Another fraction goes through coupling hole 22 and divides as shown at A' and B'. The energy B' adds in phase with the energy A and is discharged at end 30. This is so because while there is zero phase change in going through the edge of wave guide 12 toward the right (arrows A and A'), there is 180° phase change in going toward the left (arrows B and B'). Thus there is a phase change of 90° in traversing the bend 14, a phase change of 180° for arrow B', and another phase change of 90° in traversing the bend 18. This totals 360°, hence the energies A and B' combine in phase at the end 30.

The energies B and A' combine out-of-phase, and cancel. This is so because the phase changes in traversing the bends 14 and 18 are equal, and cancel each other, while energies B and A' are 180° out of phase. If there were any residual energy, it would be absorbed in absorber 24, but the cancellation is effective. It will be noted that it is independent of frequency (that is, independent of whether or not the distance around the bends is truly a quarter wave length), hence the directivity of the directional coupling is broad-banded.

Referring now to Fig. 4, if any energy flows in the main wave guide 12 in opposite direction (from end 28 to end 26), a fraction of the energy divides at the coupling hole 22 as shown at C and D, and another fraction of the energy divides at the coupling hole 20 as shown at C' and D'. Now the energies C and D' combine out-of-phase and cancel, and this is independent of frequency. The energies D and C' combine in phase, but are absorbed by the absorber.

It has been found empirically that the amplitude of the coupled wave in the auxiliary guide is independent of wave length, or in other words the coupling as well as the directivity is broad-banded.

It is believed that the construction and mode of operation, as well as the advantages of my improved directional coupler, will be understood from the foregoing detailed description thereof. It will also be understood that while I have shown and described my invention in a preferred form, changes may be made in the structure disclosed without departing from the spirit of the invention, as sought to be defined in the following claims. In the claims, a quarter wave distance is referred to for convenience, but this may be three quarter waves, or five quarter waves etc.

What is claimed is:

1. A directional coupler comprising two rectangular wave guides having right angle bends, one being bent in the plane of its wide dimension and the other being bent in the plane of its narrow dimension, said wave guides being crossed with their bends pointed in opposite directions, there being coupling holes through the adjacent walls of the wave guides at the crossover points, one of said wave guides being terminated by an absorber at one end.

2. A directional coupler comprising two rectangular wave guides having right angle bends, one being bent in the H-plane and the other being bent in the E-plane said wave guides being crossed with their bends pointed in opposite directions, the crossover points being a quarter wave length apart measured around the bend of either wave guide, there being coupling holes through the adjacent walls of the wave guides at the crossover points, one of said wave guides being open at both ends, and the other of said wave guides being open at one end and terminated by an absorber at the other end.

3. A directional coupler comprising, in combination, a main rectangular wave guide having a right angle bend in the E-plane, an auxiliary rectangular wave guide having a right angle bend in the H-plane, said wave guides being crossed with their linear lengths perpendicular and a coupling hole at each crossover point, said holes being arranged to intercept a portion of the longitudinal component of the magnetic field in said main wave guide when electromagnetic energy is propagated therein.

4. A directional coupler as defined in claim 3 wherein said holes are spaced apart a quarter wave length of the electromagnetic energy propagated in said main wave guide as measured around the bend of either wave guide.

5. A directional coupler comprising, in combination, a main rectangular wave guide having first and second linear lengths joined by a right angle bend made in the E-plane, an auxiliary rectangular wave guide having first and second linear lengths joined by a right angle bend made in the H-plane, means for securing said wave guides such that said first and second linear lengths cross at right angles, means for providing coupling between said wave guides at said crossover points, said coupling means comprising a pair of apertures which are spaced a quarter wave length apart as measured along the central axis of either said main or said auxiliary wave guide, means for coupling electromagnetic energy to one end of said main wave guide and means for terminating one end of said auxiliary wave guide with an energy absorptive element.

6. A directional coupler comprising, in combination, a first rectangular wave guide having a right angle bend in the E-plane, a second rectangular wave guide having a right angle bend in the H-plane, means for coupling electromagnetic energy to one end of said first wave guide, and means cooperating with the longitudinal component of the magnetic field of said electromagnetic energy for producing in said second wave guide at points spaced a quarter wave length apart secondary electromagnetic waves travelling in different directions and in phase opposition.

7. A directional coupler comprising, in combination, a first wave guide member having a right angle bend in the E-plane, a second wave guide member having a right angle bend in the H-plane, said guides being crossed with their bends pointing in opposite directions with the crossover points being a quarter wave length apart as measured around the bend of either wave guide and an aperture located at each crossover point and adapted to intercept a portion of the longitudinal component of the magnetic field in said first wave guide when the electromagnetic energy is coupled thereto.

References Cited in the file of this patent

UNITED STATES PATENTS

| | | |
|---|---|---|
| 2,418,809 | Albersheim | Apr. 15, 1947 |
| 2,423,390 | Korman | July 1, 1947 |
| 2,479,650 | Tiley | Aug. 23, 1949 |
| 2,513,338 | Litchford | July 4, 1950 |
| 2,519,734 | Bethe | Aug. 22, 1950 |